United States Patent
Hoshi et al.

(10) Patent No.: US 6,980,977 B2
(45) Date of Patent: Dec. 27, 2005

(54) SYSTEM FOR ACQUIRING AND ANALYZING PERSONAL PROFILE DATA AND PROVIDING THE SERVICE OF DELIVERING VARIOUS INFORMATION

(75) Inventors: Tetsuo Hoshi, Tokyo (JP); Joji Murakami, Tokyo (JP); Masahiro Ibaragi, Tokyo (JP); Kazuya Kubo, Tokyo (JP); Jun Murai, Tokyo (JP); Masaki Minami, Tokyo (JP); Takeo Kuwabara, Tokyo (JP); Masaaki Yonezawa, Tokyo (JP); Tsutomu Sano, Tokyo (JP)

(73) Assignees: Yokogawa Electric Corporation, Tokyo (JP); Internode INC, Tokyo (JP)

( * ) Notice: Subject to any disclaimer, the term of this patent is extended or adjusted under 35 U.S.C. 154(b) by 418 days.

(21) Appl. No.: 10/007,887

(22) Filed: Nov. 5, 2001

(65) Prior Publication Data

US 2002/0083043 A1    Jun. 27, 2002

(30) Foreign Application Priority Data

| | | | |
|---|---|---|---|
| Nov. 30, 2000 | (JP) | ............................ | 2000-366066 |
| Nov. 30, 2000 | (JP) | ............................ | 2000-366067 |
| Jan. 23, 2001 | (JP) | ............................ | 2001-014494 |
| May 17, 2001 | (JP) | ............................ | 2001-147547 |

(51) Int. Cl.[7] ........................... G06F 7/00; G06F 17/30
(52) U.S. Cl. ................................ 707/1; 707/5; 707/10
(58) Field of Search ....................... 707/10, 5, 1; 705/2, 705/14; 709/201, 231

(56) References Cited

U.S. PATENT DOCUMENTS

| | | | | |
|---|---|---|---|---|
| 6,005,939 | A * | 12/1999 | Fortenberry et al. | ........... 705/76 |
| 6,061,082 | A * | 5/2000 | Park | ............................ 725/14 |
| 6,260,021 | B1 * | 7/2001 | Wong et al. | .................... 705/2 |
| 6,324,519 | B1 * | 11/2001 | Eldering | ....................... 705/14 |
| 6,411,684 | B1 * | 6/2002 | Cohn et al. | ............... 379/88.14 |
| 6,493,688 | B1 * | 12/2002 | Das et al. | ...................... 706/20 |
| 6,539,375 | B2 * | 3/2003 | Kawasaki | ....................... 707/5 |
| 6,578,201 | B1 * | 6/2003 | LaRocca et al. | ............... 725/86 |
| 6,727,914 | B1 * | 4/2004 | Gutta | ......................... 715/719 |
| 6,738,978 | B1 * | 5/2004 | Hendricks et al. | ............. 725/35 |
| 6,782,253 | B1 * | 8/2004 | Shteyn et al. | ............. 455/414.1 |
| 6,813,619 | B2 * | 11/2004 | Devara | ......................... 707/10 |
| 2001/0012299 | A1 * | 8/2001 | Dahlen | ........................ 370/429 |
| 2001/0013068 | A1 * | 8/2001 | Klemets et al. | .............. 709/231 |

* cited by examiner

*Primary Examiner*—Mohammad Ali
*Assistant Examiner*—Kuen S. Lu
(74) *Attorney, Agent, or Firm*—Moonray Kojima

(57) ABSTRACT

An information delivery system having a service section; a plurality of nodes connected to the service section through a network and allocated with specific addresses that are unique within the network; and terminal devices for system users connected to the service section and the plurality of nodes through the network; wherein the service section acquires profile data of each node user through each node and analyzes the person profile data in order to mediate between each node user and each system user according to the profile data to help exchange information.

14 Claims, 13 Drawing Sheets

SYSTEM FOR ACQUIRING AND ANALYZING PERSONAL PROFILE DATA AND PROVIDING THE SERVICE OF DELIVERING VARIOUS INFORMATION

BACKGROUND OF THE INVENTION

1. Field of the Invention

The present invention relates to a system for acquiring and analyzing data on users' personal profiles, such as audience ratings, and providing the service of delivering various information, including broadcast and advertisement content, according to the users' personal profiles.

2. Description of the Related Art

Today's advertisement media include newspapers, magazines, television and radio. In all of these, advertisements in principle are broadcast to an indefinite number of readers or viewers.

FIG. 1 is a conceptual view showing an example of the current way of delivering broadcast and advertisement content. CATV content, among broadcast content delivered from a broadcast content delivery section 1, is input through a set-top box 3 for which each of users 2 has signed a contract, to a videocassette recorder 4 (hereinafter referred to as a VCR 4) and to a television 5 as well. Similarly, the content of terrestrial and satellite broadcasting is input through their respective antennas to the VCR 4 and television 5. Thus, the user 2 selectively views desired broadcast content input to the VCR 4 and television 5.

In other words, today's broadcast content in the system shown in FIG. 1 is delivered from the broadcast content delivery section 1 to an indefinite number of users 2 (or subscribers in the case of CATV or fee-based satellite broadcasting).

Now, the relationship between broadcast content and advertisement content is considered. A television broadcasting station, which is an example of the broadcast content delivery section 1, works in cooperation with a production company to produce broadcast content that the user 2 may want. An advertiser asks the station to insert advertisement content into the broadcast content in question, provided that the advertiser sponsors the broadcast content.

Accordingly, a viewer, who is the user 2 and is supposed to view the advertisement content of the advertiser, watches broadcast content of interest.

However, the flow of information in such a conventional way of content delivery is unilateral: information flows from the broadcasting station serving as the broadcast content delivery section 1 to the user 2. Therefore, the broadcasting station or advertiser does not know what action (change in attitude) a user who viewed the advertisement content has taken.

This means that in the case of content delivery in the broadcasting form shown in FIG. 1, it is difficult to precisely measure the audience rating or the effectiveness of advertisements (cost-performance ratio), or quantitatively evaluate improvements in the effectiveness of advertisements.

The conventional way of delivering advertisement content takes advantage of the fact that in broadcasting, content is delivered to an indefinite number of users. It is therefore difficult to identify each individual user and deliver advertisement content according to the profile of the user.

One possible, popular method of acquiring the profile of the user 2 is questionnaire survey. With this method, however, the data acquired by questionnaire with regard to the preferences, life style, or sense of value of the user 2 does not always remain consistent and may become obsolete over time.

Audience ratings are used as an index of the degree of attention to any particular broadcast content. The number of samples taken from a surveyed audience is usually small, however, compared with the statistical population. At present, therefore, the audience rating is determined by estimation.

The content of broadcasting as an advertising medium is merely transient, appealing to the user 2 only through advertising images. Even if the user 2 is interested in a particular advertisement that is broadcast, there is no means of obtaining information on that advertisement via the broadcast content.

In broadcast content delivery based on broadcasting, a program producer (content provider) has the following problems:

1) The delivery usually requires large-scale program production, which is a high barrier against participation.
2) The program producer cannot provide such small-scale content as those dedicated to data only.
3) Since there is only a limited number of media channels, significant cost is required to own such channels.

What the user 2 receives is normalized content only, so the user 2 cannot receive any personalized content.

One possible means for solving these problems inherent with broadcasting-based content delivery is editing such items of user information as phone numbers into a directory and providing the directory to system users who are advertisers.

In the field of the Internet, it may also be possible to obtain users' personal information by identifying user information (cookies) embedded in a WWW browser on a Web site. Directory information in the former case has the following problems, however:

1) The information is not up to date.
2) The obtained directory information must be accessed by system users themselves, one item at a time.
3) Simultaneous, real-time access is not possible to all users contained in the directory information.
4) It is difficult to obtain a directory based on profiles customized for each system user. Creating such a directory is extremely costly.

When obtaining users' personal information according to cookies in the latter case, the following problems arise:

1) obtaining such information involves using personal data without permission from the user.
2) Such personal information is available only on a Web site basis. User information therefore is not controlled in an integrated manner.
3) User profiles can be changed on a Web site basis. Thus, consistency of profile data is not guaranteed, and its reliability is low.
4) It is not possible for an advertiser to carry out "push-type" content delivery intended for specific target users.
5) It is not possible to carry out marketing only, without running a Web site.

SUMMARY OF THE INVENTION

Accordingly, the object of the present invention, which is aimed at solving the above-discussed problems, is to provide an information delivery service system for acquiring users' personal profile data, such as audience ratings, from the Internet and analyzing the data, and delivering various information in real time and in a dynamic manner, including broadcast and advertisement content, according to the acquired, analyzed personal profile data.

The information delivery service system that achieves the above-mentioned object comprises:

a system service section;

a plurality of nodes connected to the system service section through a network and allocated with specific addresses that are unique within the network; and terminal devices for system users connected to the system service section and the plurality of nodes through the network;

wherein the system service section selectively delivers at least either advertisement or information content suited for the profile of each node-user.

The system is expected to improve the effectiveness of delivered information, such as advertisement content. The system also makes it possible to establish rules of delivering information, such as advertisement content that is very effective.

In one aspect of the present invention, the system service section uses at least either user-specific static data independent of time lapse or user-specific dynamic data dependent on time lapse, as user profile data.

Accordingly, it is possible to suitably narrow the choice of target users to whom advertisement content is delivered, by selectively using user profile data according to the level of request made by an advertiser.

In another aspect of the present invention, the system service section delivers at least either advertisement content or information content related to broadcast content.

Accordingly, it is possible to provide in real time the latest information on tourist attractions, fashions or restaurants on display on the screens of broadcast content that users are viewing, thus possibly stimulating users' purchasing desire.

In yet another aspect of the present invention, the system service section updates the user profile data according to a record of user access to content.

Accordingly, it is possible to prevent the user profile data from becoming obsolete.

In yet another aspect of the present invention, the system service section acquires and analyzes audience data according to a record of user access to broadcast content.

Accordingly, it is possible to analyze the audience data in real time and in a multifaceted manner.

In yet another aspect of the present invention, the system service section performs at least either billing to an advertiser or measurement of advertisement effectiveness, according to a record of data on access to advertisement content.

Accordingly, it is possible to close a reasonable delivery contract according to actually measured data.

In yet another aspect of the present invention, transmission of at least either a record of data on access to advertisement content or a record of data on access to broadcast content from each node to the system service section is carried out in response to a request from the system service section.

Accordingly, submission to control by the system service section is only the requirement that each node must satisfy when a record of data on access is transmitted. Consequently, the load on the node can be reduced.

In yet another aspect of the present invention, transmission of at least either a record of data on access to advertisement content or a record of data on access to broadcast content from each node to the system service section is autonomously carried out by each node in response to a request from the system service section.

Accordingly, load on the system service section can be reduced during acquisition of a record of access data.

In yet another aspect of the present invention, the node-user declares the limit of profile data disclosure against the system service section and obtains a level of service appropriate for the disclosure limit from the system service section.

The system service section successively updates, acquires and analyzes the profile data of each user in real time. The section then combines these latest items of profile data with an application designed for delivering advertisement or information content and conducting different types of questionnaire survey, in order to mediate between each node-user and each system user to help exchange information.

When conducting a questionnaire survey, it is possible to narrow down users to a more interested group.

Each user can view advertisement content that is suited to the user's own profile and of greater interest.

Another advantage is that a questionnaire may contain more questions in a field that matches the user's own profile and that are therefore more interesting. Thus, the user will be more willing to answer the questions.

In yet another aspect of the present invention, at least either a sensor system or an actuator system is connected to each node, and control is carried out so that at least either the output screen of the sensor system or the operation screen of the actuator system is provided according to the user's operation.

Accordingly, the user can monitor the results of sensor-based measurement or detection on the screen and operate with the actuator system of interest from the screen.

In yet another aspect of the present invention, a plurality of remote controller nodes capable of adding timestamps to and storing received remote controller output signals and sending out the signals through the Internet are connected as the nodes, and the system service section acquires remote controller output signals sent out from each remote controller node and analyzes the way operation is performed with each remote controller.

Accordingly, it is possible to make different types of data analysis according to the way operation is performed with each remote controller.

In yet another aspect of the present invention, a plurality of remote controller nodes capable of adding timestamps to and storing received remote controller output signals and sending out the signals through the Internet are connected as the nodes, and the system service section acquires remote controller output signals sent out by each remote controller node and analyzes and processes the way operation is performed with each remote controller and the user profile, as well as delivers advertisement content to each remote controller node according to the user profile.

Accordingly, it is possible to deliver the advertisement content of a product that is more likely to be purchased by the user.

In yet another aspect of the present invention, each remote controller node sends a remote controller output signal to the system service section each time the relevant remote controller is operated, and the system service section analyzes and processes data on the television audience ratings.

Accordingly, it is possible to make analyses based on real-time data, provide data on the instant audience ratings of television in real time, and deliver to the user the most recent profile based advertisement content of a product that is more likely to be purchased.

In yet another aspect of the present invention, an operation logging, analyzing and communication unit is located between the remote controller and remote-controlled devices, in order to precisely know the status and operation history of such devices as the VCR 4 and television 5 being remote controlled. Thus, the system is configured so that the operation logging, analyzing and communication unit relays signals from the remote controller to the remote-controlled devices.

Accordingly, it is possible to prevent any remote controller signal from being missed at the remote controller node. Consequently, the system can provide highly accurate audience ratings data.

DESCRIPTION OF THE PREFERRED EMBODIMENTS

Figure 2:
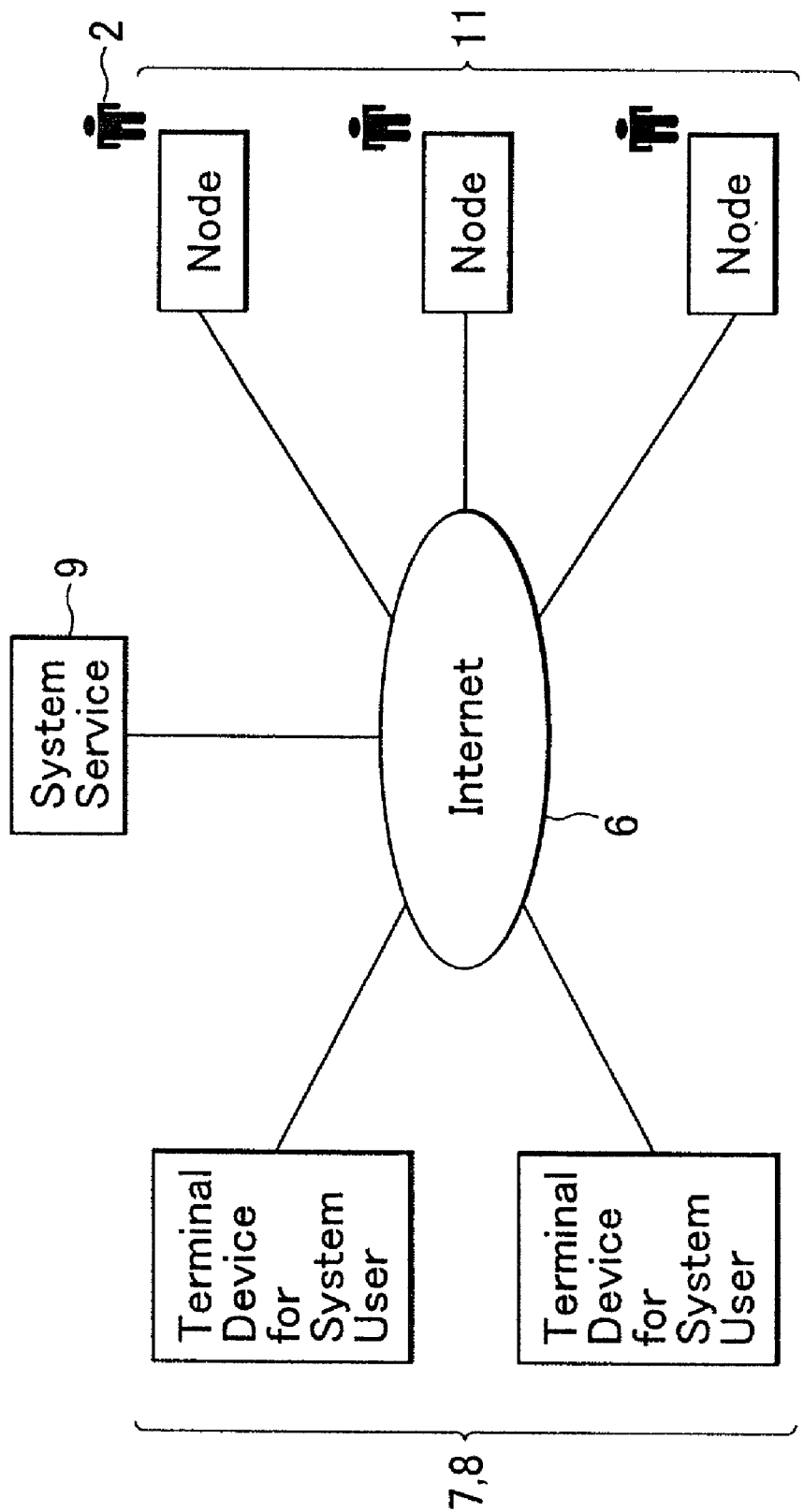
FIG. 2 is a conceptual view showing the system in accordance with the present invention.

FIG. 2 is a conceptual view showing the system in accordance with the present invention.

In FIG. 2, terminal devices 7 and 8 for system users who are, for example, advertisers or advertising agents and use the system to deliver advertisement and information content, a system service section 9 for operating and controlling the overall system, and a plurality of nodes 11 for viewing advertisement and information content and providing the profile data of each of the users 2, for example, are connected to the Internet 6.

The system service section 9 has such capabilities as acquiring and analyzing the profile data and having access to data of each user 2, acquiring and delivering advertisement and information content provided by the terminal devices 7 and 8 for system users, analyzing audience ratings in relation to broadcast content, measuring the effectiveness of advertisement, and billing advertisers.

Addresses, which are unique within an IPv6-based network, for example, and are used to identify node users, are allocated to the nodes 11. As the nodes 11, a sensor node having at least one sensor for measuring at least one of such physical quantities as temperature, humidity, pressure, image, sound, vibration and on-off contact signals; a remote controller node capable of remote control; a set-top box (STB) node capable of receiving broadcast, advertisement and information content; and other types of nodes are used.

In an information services system configured as shown in FIG. 2, the user 2 declares the limit of disclosure of profile data provided through the node 11, against the system service section 9.

The system service section 9 provides the user 2 with step-by-step incentives, such as the density of information provided and the coverage of the right to view the information, according to each limit of profile data disclosure.

The terminal devices 7 and 8 for system users sign contracts with the system service section 9 regarding the quality of service provided by the system service section 9, acquire the right of access to users 2 having profiles desired by the terminal devices 7 and 8 for system users and the right to use a given method of access, and pay costs for the services.

The system service section 9 registers or deletes user profiles; executes a matching function, intermediary function, filtering ("opt-in") function, and node checking function; registers or changes node addresses; and executes other processes, while communicating with each of the nodes 11 and the terminal devices 7 and 8 for the system users through the Internet 6.

Registration of User Profiles

When user profiles are registered, the nodes 11 owned by the users 2 and connected to the Internet 6 are made to correspond with the user profiles. As IDs for identifying the nodes 11, IP addresses are used. For the IP addresses, IPv6, for example, may be used as explained earlier.

The IP addresses of the nodes 11 and the profile data of users 2 at the nodes are stored in the system service section 9.

Since the nodes 11 can sense physical quantities or accept input from users, for example, as described earlier, it is possible to use physical quantity data detected by the nodes 11 or the users 2's actions upon the nodes 11 as user profile data, as necessary.

Matching Function

The system service section 9 samples users 2 having specific user profiles and grants the terminal devices 7 and 8 for system users, who have been authorized by contract as described earlier, the right to gain access to nodes 11 owned by the users 2. Examples of purposes of such access include distributing advertisement content and various other content and conducting questionnaire surveys.

The system service section 9 can provide different levels of service to the terminal devices 7 and 8 for system users, as described below:

For example, the terminal devices 7 and 8 for system users can combine such options as male/female, age, location and occupation, as the conditions for narrowing down the sampling characteristics of users 2.

The terminal devices 7 and 8 for system users can also define the period of access permission, such as "any time over a month" or "every Wednesday only over three months."

The terminal devices 7 and 8 for system users can specify the frequency of content delivery to users 2, such as "10 times each for 1,000 users" or "once each for 10,000 users."

The terminal devices 7 and 8 for system users can specify the time of access to users 2, such as "scheduled," "periodic," "specific time," "event-driven," or "upon a specific event." Possible types of event in this case include the birthday of each individual of the users 2, various kinds of anniversary days, scheduled events of the family of each individual user 2, information search operations used by the user 2 on the system, and operations used by the user 2 to answer a questionnaire.

Another level of service is the detection of events by means of sensors installed in the nodes 11. One example of such events is the moment of sensing a temperature or humidity rise above the given setpoint by means of thermometer or hygrometer.

Intermediary Function

The intermediary function delivers messages from the terminal devices 7 and 8 for system users through the Internet 6 and nodes 11 to sampled, specific users 2.

Note that it is possible to customize these messages according to the profile of each user 2. The format of the messages can also be customized according to the type of each node 11. The system service section 9 feeds information on the user 2's action for the messages back to the terminal devices 7 and 8 for system users. Information detected by the nodes 11 is also presented to the terminal devices 7 and 8 for system users according to the disclosure limit set by the user 2 and the contract signed by the user 2.

Filtering and "Opt-in" Functions

The nodes 11 of the users 2 are accessed by the terminal devices 7 and 8 for system users. In that case, the system service section 9 can place required limits on the access method, access details, and accessor.

For example, the system service section 9 can specify the access method as "coupon method only," "DM only," "images only," or "text only."

For access details, the system service section 9 can specify information on cars or bargain-priced buys of supermarkets, for example.

Furthermore, the system service section 9 can specify supermarkets that the users 2 routinely visit, or automakers or dealerships that the users 2 are interested in, as terminal devices 7 and 8 for system users who may be accessed. Conversely, the system service section 9 can specify terminal devices 7 and 8 for system users who may not be accessed.

Node Checking Function

The system service section 9 has the capability to check whether or not the node 11 in question is correctly connected to a destination with a pre-registered IP address. The section can also verify whether or not the node 11 connected to the destination with the pre-registered IP address is one supported by the system. If the node 11 is not supported, the system service section 9 can prohibit the use of profile data relevant to the user 2 at the node 11 corresponding to that IP address.

Registration and Change of Node Addresses

If any user 2 wants to be unregistered from the system, the system service section 9 deletes all of the user's profile data items from a user profile data file.

If there is any change in an IP address allocated to a user 2, the user's profile data is also updated automatically in a Plug and Play manner by the update function embedded in a node 11.

By configuring the system as shown in FIG. 2, physical quantities sensed by the node 11 and the user 2's actions upon the node 11, which could not previously be used as profile data, can now be used also as profile data.

Since the node 11, which is hardware, and the user 2 can be associated with each other, the user 2 can be identified more precisely, compared with conventional identification using cookies.

Since the system uses logical addresses on the Internet as IDs, the same ID can still be used even if there is any change in the physical devices of a node 11.

Since the profile data of each individual user can be controlled in a time series manner, it is possible to personalize the data in more detail, user 2 by user 2, compared with such one-dimensional profiles as content-driven user properties used for banners in a search engine.

Since IPv6 features virtually infinite address space, IPv6-based addresses are best suited for IDs identifying users around the world.

Since services that the system service section 9 provides are in the form of an ASP model wherein the services are provided as applications on a server, it is possible to implement elaborate services at low cost, without the need for any manpower.

The system service section 9 selectively delivers advertisement content well suited for the profile or recent status of a user 2.

The system service section 9 successively updates user profile data and bills advertiser, according to a record of clicks by each user 2 on advertisement content or a record of product purchases.

The system service section 9 controls the term of validity of advertisement content so as not to deliver any out-of-date content to the users 2. If any advertisement content is stored in the node 11 of a user 2 and becomes out-of-date, the section deletes the content.

Since a system user can lease necessary user space when needed, the user need not make any new expensive capital investment at its own cost. Rather, the system user can intensively invest in its core business, for example, marketing, thus increasing management efficiency.

The system of the present invention is also effective for one-to-one marketing, such as making decisions on target users, narrowing down potential users, and locking in users. Specific applications include personalized advertisement and content delivery using personal profile data and questionnaire surveys also using personal profile data.

By allowing users themselves to gain access to other users that satisfy requirements according to profile data, it is also possible to launch a peer-to-peer service wherein users exchange data on equal terms with each other.

By interconnecting the advertisement content delivery system and a purchasing system managed by an advertiser, it is possible to measure the effectiveness of advertisement content services as a purchase rate based on the number of users who actually bought products according to the advertisement content.

By taking advantage of such a system configuration as described above, the system service section 9 can conduct an online questionnaire survey on the advertisement content or advertised products, and acquire and analyze the survey results.

Since the system service section 9 owns the profile data of each user 2, it is possible to summarize the answers and opinions of users 2 on a profile basis and analyze them in a multifaceted manner.

A system administrator who manages and operates the system service section 9 controls the delivery of advertisement content based on the profiles of many users 2 and manages data on clicks. Accordingly, the system administrator can make "push" sales or offer consultations to the advertiser. Furthermore, the system administrator can hold an auction of advertisement spaces according to a specific record of data on clicks.

First Embodiment

Figure 1:
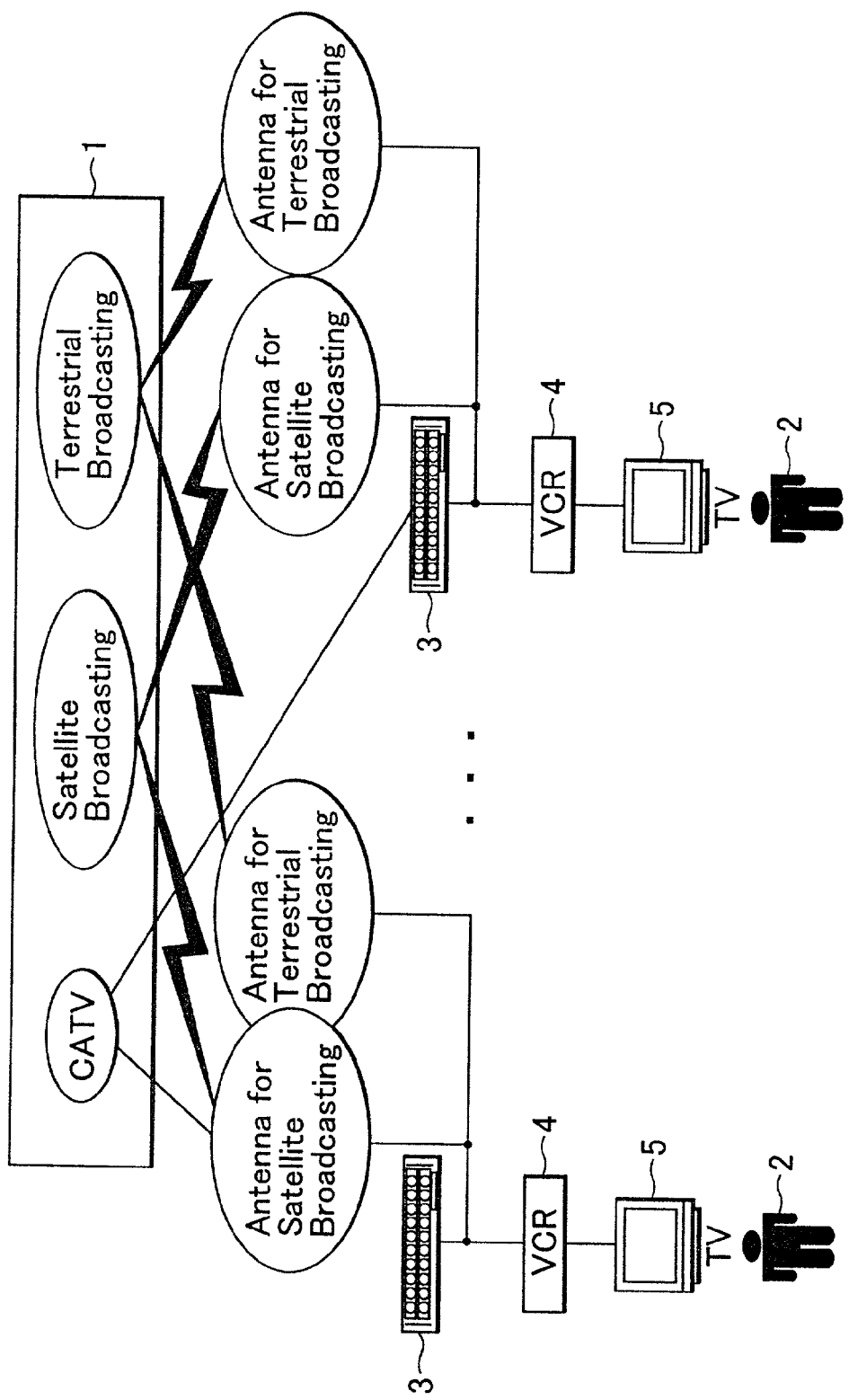
FIG. 1 is a conceptual view showing a prior art system.
Figure 3:
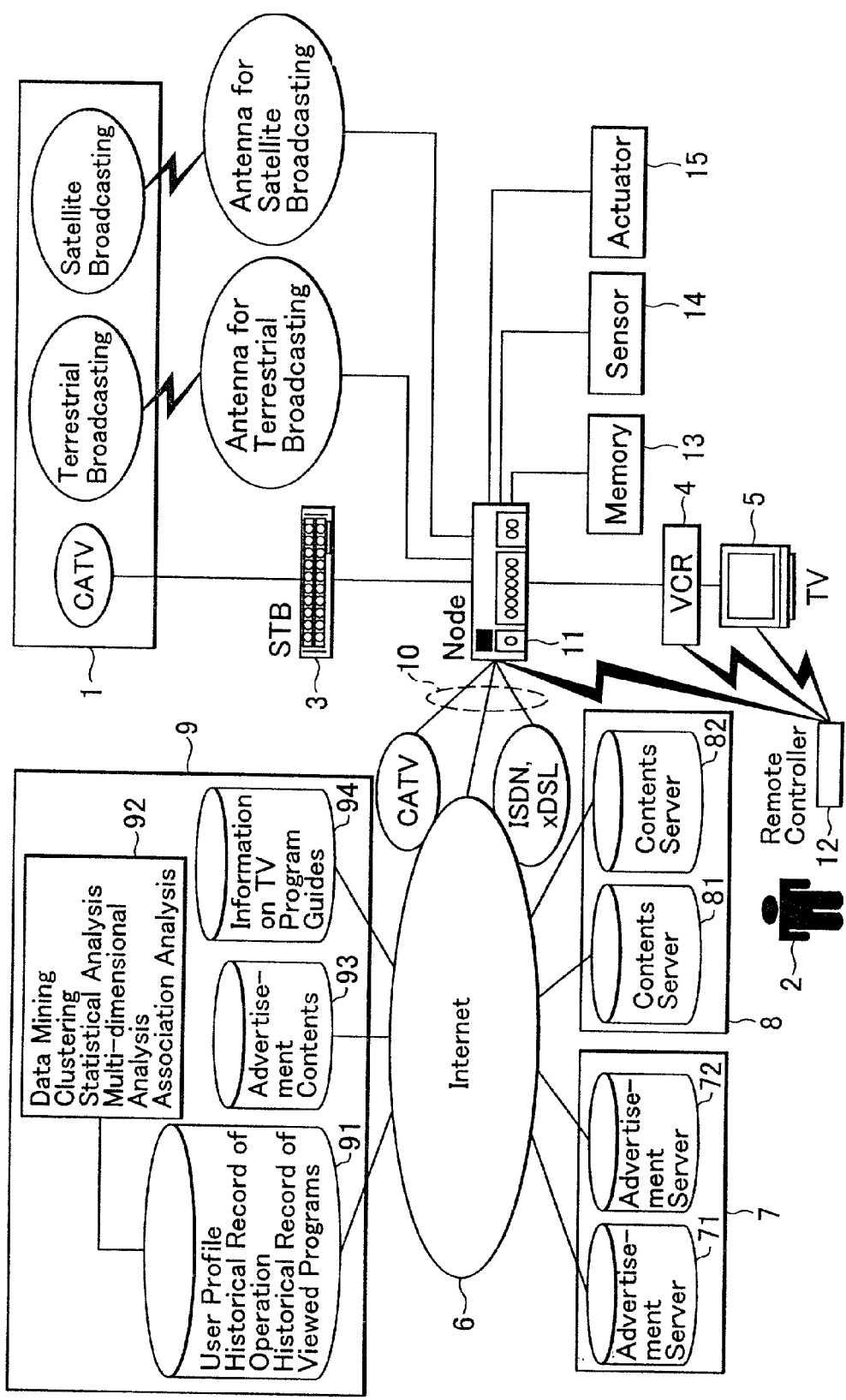
FIG. 3 is a schematic view showing a first embodiment of the system in accordance with the present invention.

FIG. 3 is a schematic view showing a first embodiment of the system in accordance with the present invention, wherein elements identical to those of FIG. 1 are referenced alike.

Connected to the Internet 6 are, for example, an advertisement server section 7, an information content server section 8, a system service section 9, and a node 11.

The node 11 and the Internet 6 are connected to each other through transfer means 10 such as a CATV cable, ISDN or XDSL telephone circuit, or fiber-optic cable.

Input to the input terminal of a set-top box (STB) 3 is a CATV signal, among the signals of a broadcast content delivery section 1, and the node 11 is connected to the output terminal of the STB 3.

TV signals of terrestrial and satellite broadcastings are input to the node 11 through their respective antennas, and a television 5 is connected to the output terminal of the node 11 through a VCR 4. Note that the VCR 4 is not essential and the television 5 may be directly connected to the output terminal.

The advertisement server section 7 comprises advertisement servers 71 and 72 wherein advertisement content is stored. The advertisement content stored in the advertisement servers 71 and 72 is delivered through the Internet 6 to the node 11 of the user 2, according to control by the system service section 9.

The information content server section 8 comprises contents servers 81 and 82 wherein information content other than advertisement content, such as text, voice and images, and various other information content related to broadcast programs are stored. The information content stored in the contents servers 81 and 82 are delivered through the Internet 6 to the node 11 of the user 2, according to control by the system service section 9.

The system service section 9 comprises, for example, a service data server 91, a data processing section 92, a server 93 for advertisement contents, and a server 94 for information on TV program guides.

The service data server 91 stores various data items of a user 2, including a profile, a historical record of operation, and a historical record of viewed programs.

The data processing section 92 performs various types of analysis according to data accumulated in the service data server 91, including data mining, clustering, statistical analysis, and multi-dimensional analysis, that are necessary in order to individually deliver efficient advertisement content intended to motivate the user 2 toward purchasing products.

The server 93 for advertisement contents stores templates that the advertisement server section 7 uses when creating content.

The server 94 for information on TV program guides stores such items of information as the program guide of each broadcast content delivered by the broadcast content delivery section 1, advertisers for each program, advertisement broadcasting time tables, and costume service providers.

The node 11 obtains, for example, broadcast content delivered via CATV, terrestrial broadcasting or satellite broadcasting from the broadcast content delivery section 1, and advertisement content delivered via the Internet 6 from the system service section 9. These content are output through a VCR 4 to a television (TV) 5 so that the content are displayed in their respective view areas of the TV screen. Addresses, which are unique within an IPv6-based network, for example, and are used to identify node users, are allocated to the node 11.

The node 11 is configured so as to operate in response to the control signals of a general-purpose remote controller 12 that the user 2 operates in order to control the VCR 4 or TV 5. The node 11 successively stores such operation details as power-on/off by the remote controller 12, timer-recording of programs and channel selection, as historical records of operation and viewed programs, along with timestamp data on these operations. These data items stored in the node 11 are transmitted as necessary, according to requests from the system service section 9, in order to analyze the effectiveness of advertisements or personal profiles. Alternatively, the node 11 autonomously transmits the data items to the system service section 9 at regular times.

Note that the node 11 is provided with cache memory for temporarily storing, for example, the profile data of the user 2 and advertisements and information content based on the profile data, so that a plurality of nodes 11 can have online access to the Internet 6, though the memory is not shown in the figure.

In addition to the cache memory, the node 11 may be provided with another memory 13 for regularly storing user-specific data items, as necessary, including the profile data of the user 2 and advertisement and information content based on the profile data, so that the node 11 autonomously and selectively reads out necessary content in response to remote controller operation by the user 2 and shows them on the TV screen.

Furthermore, a plurality of sensors 14 for on-demand remote monitoring by the user 2, such as thermometers and cameras, and a plurality of actuators 15 for remote operation by the user 2, such as switches and control mechanisms, are connected to the node 11 as necessary.

Note that the STB 3 may be integrated with the node 11.

In the system configuration of FIG. 3, the information content server section 8 provides information content that the user 2 wants to obtain. An advertiser either sponsors the information content or delivers its own advertisements as the content via the Internet 6.

Thus, the user 2 can view information content of interest, along with the advertisement content of the advertiser.

The system service section 9 earns a profit by mediating between the information content server section 8 and the advertiser, and between the section 8 and the user 2. The profit is produced as a margin between the advertisement fee paid by the advertiser and the cost of creating content for the information content server section 8.

Now the role and behavior of each element in the system of FIG. 3 are explained in detail.

User 2

The user 2 registers its personal profile with the system service section 9. In addition, the user 2 searches for information content the user 2 wants to view or interesting or uninteresting advertisement content from the system service section 9, registers these content with the system service section 9, or deletes the content therefrom. Such registration and deletion may be carried out online using the node 11, or achieved by logging in to the homepage of the system service section 9.

Thus, the user 2 can receive information and advertisement content that are delivered according to the information the user 2 has registered with the system service section 9. Note that the information and/or advertisement content may be associated with broadcast content as necessary.

The user 2 can, at any time, hide the information and advertisement content output from the node 11 to the TV 5 for display.

Advertisement Server Section 7

The advertisement server section 7 registers with the system service section 9, advertisement content and the target profiles of users 2 to whom the section wants to deliver the advertisement content. The system service section 9 selectively delivers advertisement content to the users 2 identified as matches. In this case, the system service section 9 may also provide the users 2 with the specific profiles thereof or information content.

Information Content Server Section 8

The information content server section 8 registers with the system service section 9, the information content that the section 8 wants to offer to the user 2. These information content may or may not be those related to broadcast or advertisement content for television.

The system service section 9 delivers the information content to the users 2 searched out as matches. In this case, the system service section 9 may also provide the users 2 with the specific profiles thereof or advertisement content. Alternatively, it is possible to provide such information content as programs or movie recommendations personalized for users, according to a historical record of behaviors taken by the users 2.

System Service Section 9

The system service section 9 integrally controls the node 11 and the profile of the user 2 who owns the node 11. The user profile contains static items, such as sex and date of birth, and dynamic items that become available dynamically as the user 2 gains access to services. The system service section 9 controls both of them.

When delivering advertisement content, the system service section 9 searches out matches between the users 2 and the advertiser, according to the user profiles and the target profiles for which the advertiser wants to deliver advertisements. Then, the system service section 9 controls the advertisement server section 7 so that given advertisement content is delivered to the users 2 who satisfy the search conditions.

In the case of information content, the system service section 9 searches out matches between the information content server section 8 and the users 2, according to the information content that the users 2 have registered in the hope of viewing them. Then, the system service section 9 controls the information content server section 8 so that given appropriate information content is delivered to the users 2 who satisfy the search conditions.

Alternatively, the system service section 9 may search for matches among the advertiser, the information content server section 8 and the users 2, according to the user profiles, the target profiles for which the advertiser wants to deliver advertisements, and the information content that the users 2 have registered in the hope of viewing them. Then, the system service section 9 may control the advertisement server section 7 and the information content server section 8 so that appropriate advertisement content and information content are delivered to the users 2 who satisfy the search conditions.

The system service section 9 measures the effectiveness of advertisements by acquiring the personal profile of the user 2 from the node 11 through the Internet 6 and analyzing the profile. More specifically, the section counts users interested in particular advertisement content and produces prototypes of the profiles of the users who were interested in the advertisement content.

The system service section 9 also reproduces the profile of each individual user to update personal profiles that the node 11 maintains, in order to cope with variations in the personal profiles with time.

Now specific examples of services provided by the system of FIG. 3 are explained below.

Figure 4:
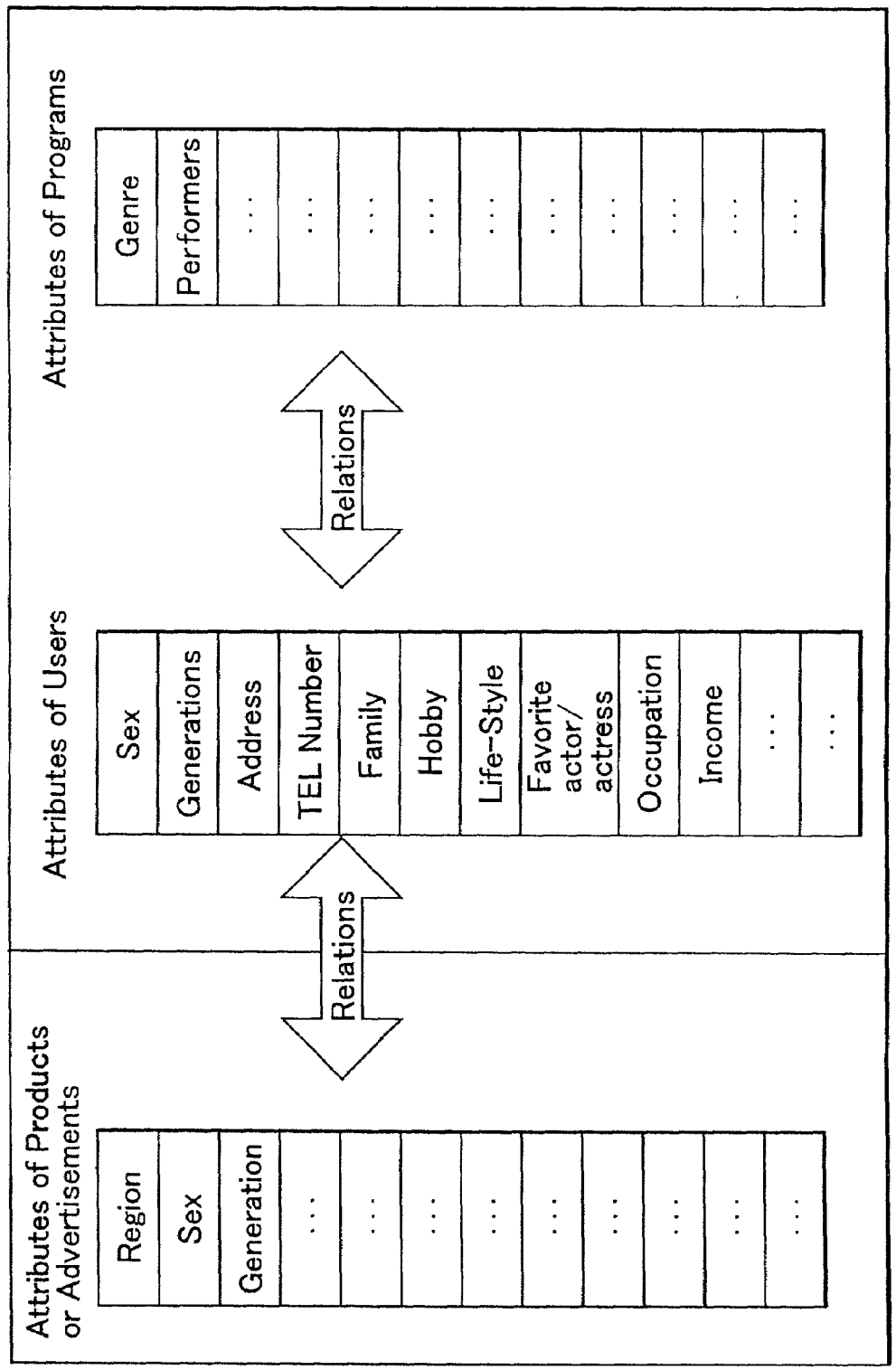
FIG. 4 is a schematic view explaining the way data-to-data relationships in a system service section 9 shown in FIG. 3 are analyzed.

FIG. 4 is a schematic view explaining the way data-to-data relationships in the system service section 9 are analyzed. The system service section 9 can analyze data-to-data relationships according to acquired data from a variety of viewpoints, for example, attributes of target products, attributes of users and attributes of programs, as shown in FIG. 4. Thus, the section can provide a wide choice of services such as enumerated below:

1) Analyzing the user 2's historical record of viewed programs and the attributes of the programs, and suggesting programs that the user 2 is likely to view.
2) Analyzing the relationship between the targeted buyers of products (or those advertised) and users viewing programs, and delivering advertisement content relevant to the programs to users 2 close to that tier of buyers. This service makes it possible to improve the effectiveness of advertisements.
3) Counting users 2 who accessed any given advertisement content to measure the cost-performance ratio. In this service, it is also possible to analyze the profiles of the users 2.
4) Delivering the advertisement content of a product relevant to a broadcast content that the user 2 is viewing to the node 11 for display. This service will help improve the effectiveness of advertisements.

EXAMPLE

If the broadcast content is character animation, the system service section 9 delivers content related to products using the relevant character, as advertisement content for the broadcast content.

5) Delivering advertisement content related to information on the community in question. This service will help increase the effectiveness of advertisements.

EXAMPLE

The system service section 9 delivers an advertisement for bargain sales run by a mall shop or shops in a community where the relevant viewers live.

6) Delivering advertisement content in real time. This service will help improve the effectiveness of advertisements.

Example a)

On a record cold day in winter, the system service section 9 delivers an advertisement for products that will help users keep themselves warm.

Example b)

The system service section 9 delivers an advertisement for favorite, strong-selling products, according to up-to-date results of a consumer trends survey. It is also possible to deliver the results as supportive information.

7) Broadcasting an advertisement of any open campaign in a delivery of broadcast content and, at the same time, delivering advertisement content to viewing users meeting given target-user requirements, thereby informing them of an offer of free samples. This service will help improve the effectiveness of advertisements.

EXAMPLE

In a campaign for cosmetic products, the system service section 9 delivers advertisement content to female office workers in their twenties, informing them of an offer of free samples.

8) Broadcasting an advertisement of any wide-area open campaign in a delivery of broadcast content and, at the same time, delivering advertisements localized to the user 2's neighborhood. This service will help improve the effectiveness of local-area advertisement.

EXAMPLE

In an open campaign of car sales, the system service section 9 delivers advertisement content of dealerships, which deal with the car in question in the neighborhood, to the user 2.

9) Surveying viewers in real time by counting them from a variety of viewpoints.

EXAMPLE

Figure 5:
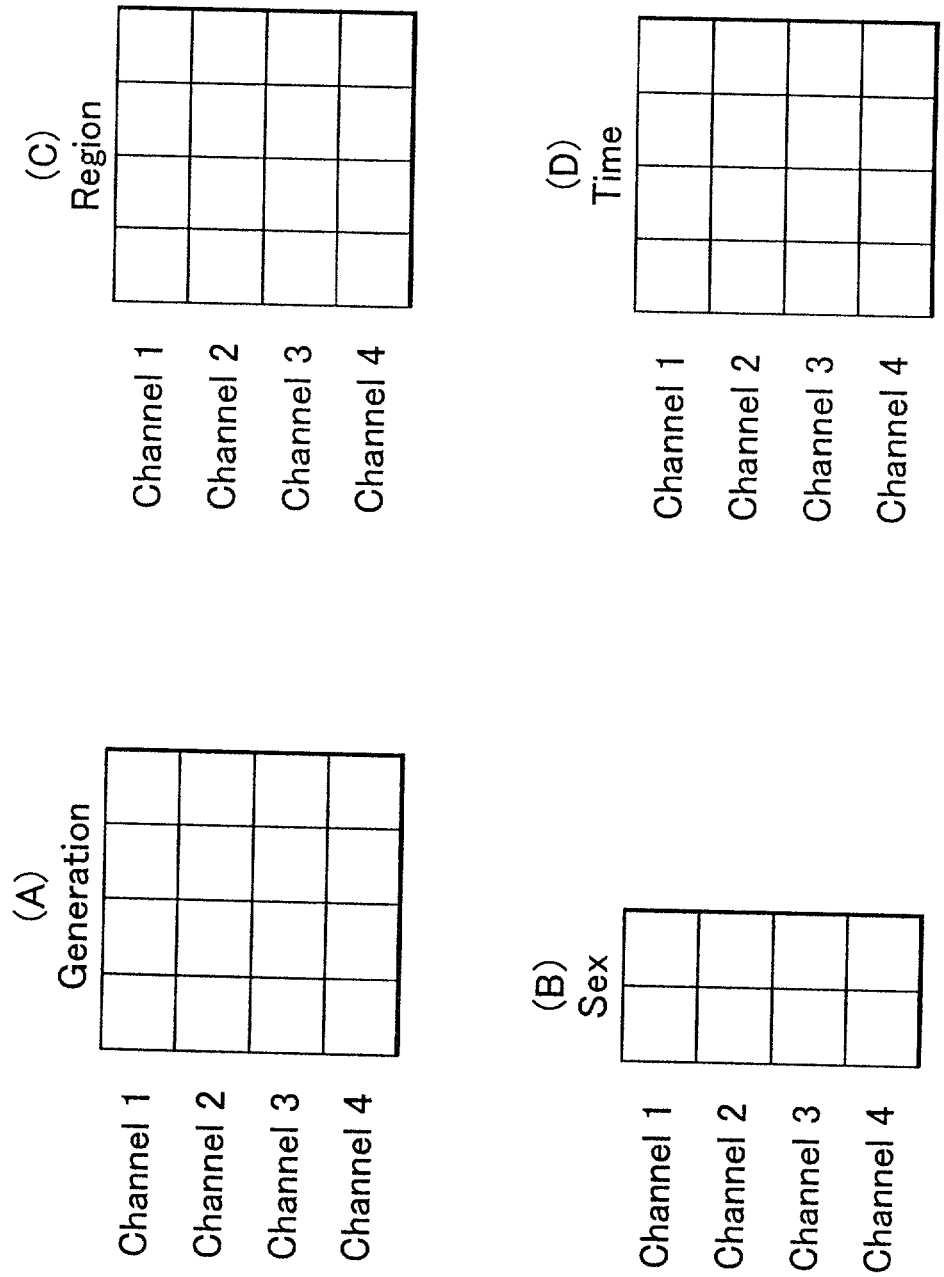
FIG. 5 is a schematic view showing an example of audience data in the system of FIG. 3.

The system service section 9 can conduct a relational analysis for each of multiple broadcasting channels, by using multiple data items, such as (A) generation, (B) sex, (C) region and (D) time, as shown in FIG. 5. The section can also perform data mining based on information theory and make analyses based on statistics.

Besides being able to conduct various types of analysis as described above, the system of FIG. 3 is expected to offer the following advantages, depending on the position of each party concerned.

Advertisers

An advertiser can precisely know which advertisement a viewer has watched or reacted to and, therefore, can accurately measure the effectiveness of advertisements.

The advertiser can also measure audience ratings accurately and in real time. In addition, measurement accuracy improves since the number of samples increases as the number of users 2 at the node 11 increases.

The advertiser can deliver "one-to-one" advertisement content according to the profile of each individual viewer. It is easy for the advertiser to run advertisement content based on, for example, data mining.

Program Producers (Content Providers)

It is easy for a content provider to participate in the industry since costs spent on the creation of content will reduce significantly, compared with conventional broadcast content.

Since the content provider can reuse already owned data also as content, it is possible to provide special, small-scale content consisting of data only.

Furthermore, the content provider can have access to a virtually infinite number of media channels.

Users

A user can view content created by combining, for example, mass media oriented content on which large funds have been spent and a variety of information and advertisement content available on the Internet, and then personalizing the combination according to user profiles.

According to the first embodiment described above, it is possible to realize a system for delivering broadcast and advertisement content appropriate for personal profile data, in real time and in a dynamic manner, through the Internet.

Consequently, it is possible to precisely measure the audience rating or the effectiveness of advertisements (cost-performance ratio) or quantitatively evaluate improvements in the effectiveness of advertisements which was not feasible in the conventional broadcasting form of content delivery.

Since the user profile data is successively updated according to a record of user access to content, it is also possible to prevent user profile data from becoming obsolete, as seen in conventional questionnaire-based profile data.

Also since the audience data available from the system is measured in real time, the number of samples increases as the number of nodes increases. This means that more precise data becomes available.

If a user becomes interested in a particular advertisement run through the medium of broadcast content, the user can acquire detailed information on the advertisement in real time. This means that an advertiser can expect advertisements to be more effective than before.

Furthermore, since the user can receive personalized content, the system provides another advantage that the user can save time that used to be spent viewing unwanted advertisement content.

Second Embodiment

Figure 6:
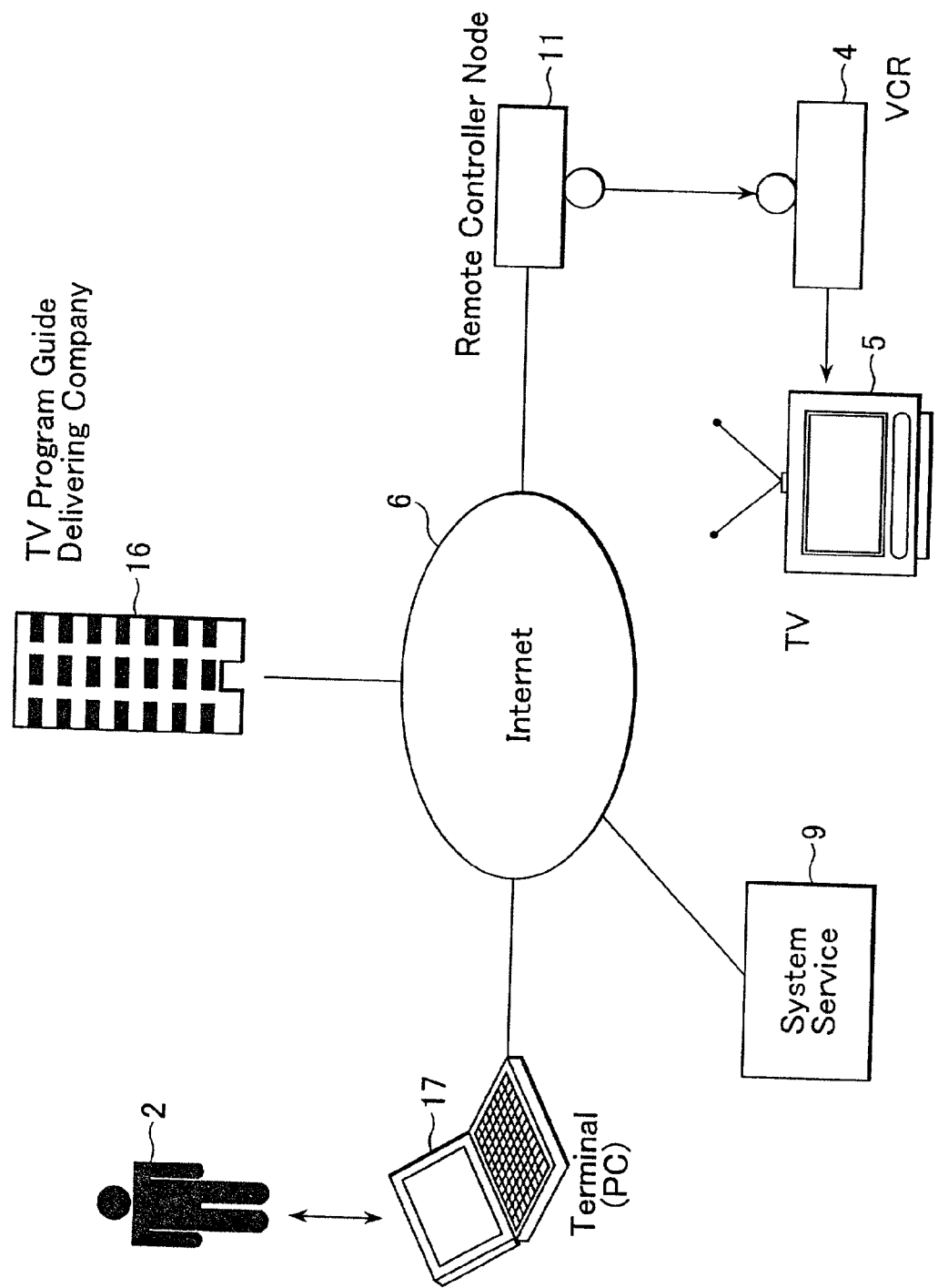
FIG. 6 is a schematic view showing a second embodiment of the system in accordance with the present invention.

FIG. 6 is a schematic view showing a second embodiment of the system in accordance with the present invention. The figure illustrates a case where a remote controller node is used as the node 11, wherein elements identical to those in FIG. 3 are referenced alike.

In FIG. 6, the remote controller node 11 is connected to the Internet 6. The remote controller node 11 downloads program guides delivered by a TV program guide delivering company 16 regularly, or irregularly according to external instructions. Then, the node saves information on the date and time when each program starts and ends and on channel numbers in a format suited for control by the node itself.

A user 2 in a distant location selects the URL of the remote controller node 11 through a screen of a general-purpose browser of, for example, a remotely located terminal (PC) 17 connected to the Internet 6 and used as an input terminal. Next, the user 2 views a program guide stored in the remote controller node 11 on the screen of the remote terminal (PC) 17. The user 2 then clicks programs of interest that the user wants to timer-record. Note that a personal digital assistant (PDA) or a mobile phone, for example, may be used in place of the terminal (PC) 17.

When the preset time arrives, the remote controller node 11 sends out remote control commands to an existing VCR 4, according to program information provided by the terminal (PC) 17. Thus, the node makes the VCR 4 start recording and then stop when the ending time arrives.

Figure 7:
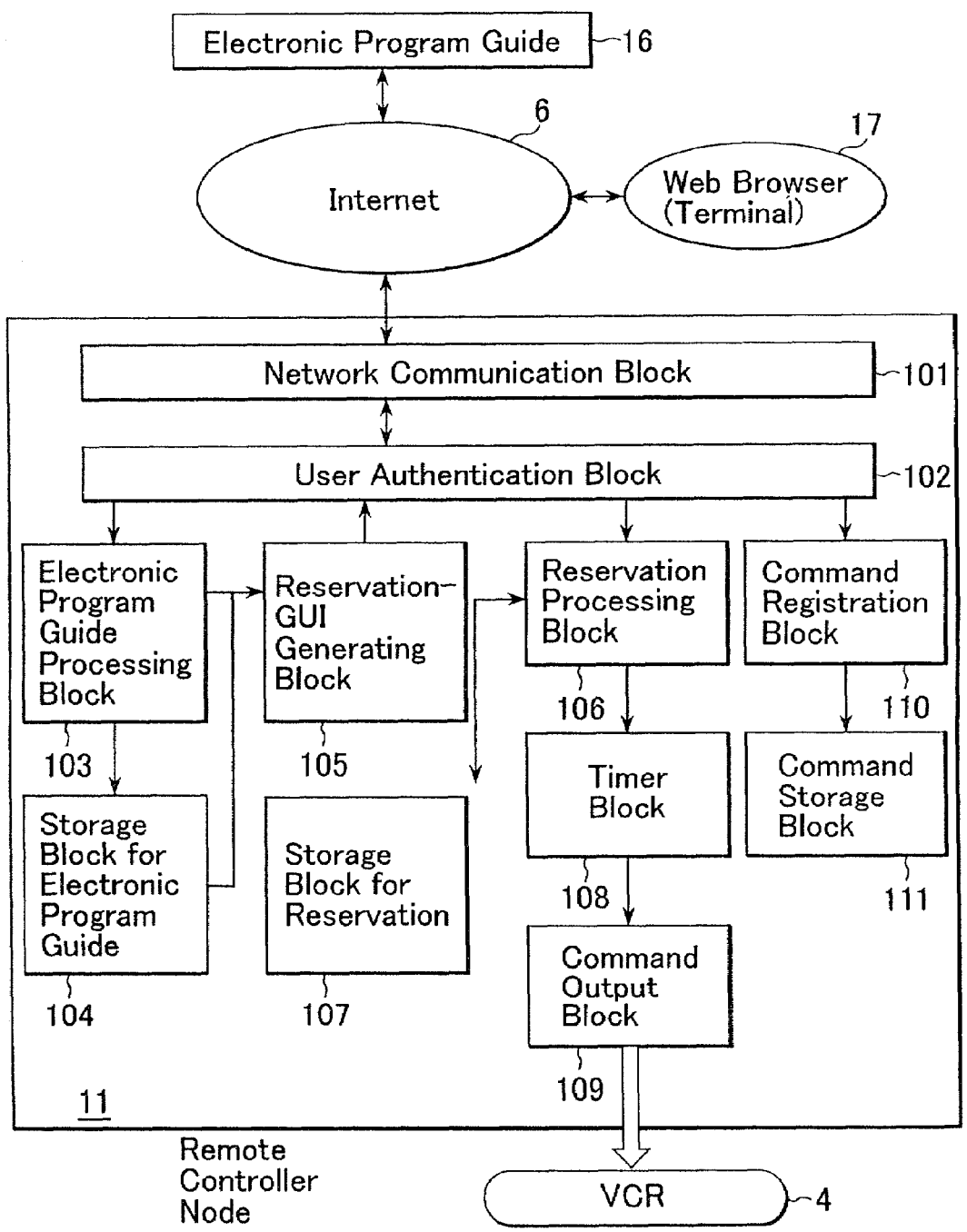
FIG. 7 is an example of the block diagram of a remote controller node 11 used in the embodiment of FIG. 6.

FIG. 7 is an example of the block diagram of the remote controller node 11 used in the embodiment of FIG. 6. The remote controller node 11 has an address, which is unique within a network based on, for example, IPv6, and is connected through a network communication block 101 to the Internet 6.

A user authentication block 102 carries out user authentication by using a combination of, for example, a user name and a password, in order to identify a user who gains access through the browser screen of the terminal (PC) 17. Note that means for user authentication are not limited to a combination of a user name and a password. Alternatively, such user-specific, highly identifiable means as fingerprints may be used.

An electronic program guide processing block 103 downloads and processes electronic program guides and then stores them in a storage block 104 for electronic program guides. Note here that in a case where electronic program guides are delivered from the TV program guide delivering company 16 to the remote controller node 11, the node performs user authentication before it downloads the guides. However, in a case where the remote controller node 11 autonomously downloads the electronic program guides, the node does not perform user authentication.

A reservation-GUI generating block 105 shows timer-recordable programs on the browser screen of the terminal (PC) 17, according to an electronic program guide stored in the storage block 104 for electronic program guides.

The user 2 selects desired programs from the timer-recordable programs shown on the browser screen, in order to timer-record the programs. The settings of the timer-recording are saved in a storage block 107 for reservation through a reservation processing block 106.

When the preset time arrives, the reservation processing block 106 controls a command output block 109 according to the timer-recording settings saved in the storage block 107 for reservation and time control by a timer 108. More specifically, a control signal for executing a given preprogrammed action is output from the command output block 109 to, for example, the VCR 4 that is a device to be remote-controlled.

Through the Internet 6, a command registration block 110 downloads a remote control code corresponding to a control signal for executing a given pre-programmed action output from the command output block 109 to such a remote-controlled devices as an existing VCR with an infrared remote control capability, and then stores the code in a command storage block 111. Note that the remote control code may be pre-registered with the command storage block 111, instead of being downloaded.

Consequently, the user 2 can replay, at any desired time, video and sound recorded in the VCR 4 on an existing TV. Note here that the VCR 4 used in the present invention may be an existing VCR with an infrared remote control capability and there is no need for retrofitting the VCR main unit for the purpose of applying the present invention.

Also note that as an alternative to the method wherein the remote controller node 11 downloads electronic program guides from the TV program guide delivering company 16, access may be made from the terminal (PC) 17 to electronic program guides of the TV program guide delivering company 16 in order to acquire in a file format only such data as necessary to timer-record the desired programs, and then transfer the data to the remote controller node 11. With this alternative method, it is possible to reduce the load on the remote controller node 11 when processing program guides.

The system service section 9 regularly acquires timer-recording data stored in the storage block 107 for reservation of the remote controller node 11, in order to perform various analyses related to preset programs.

Accordingly, it is possible to also digitize the audience ratings of programs preset on a VCR, which has been difficult to do in conventional surveys.

Figure 8:
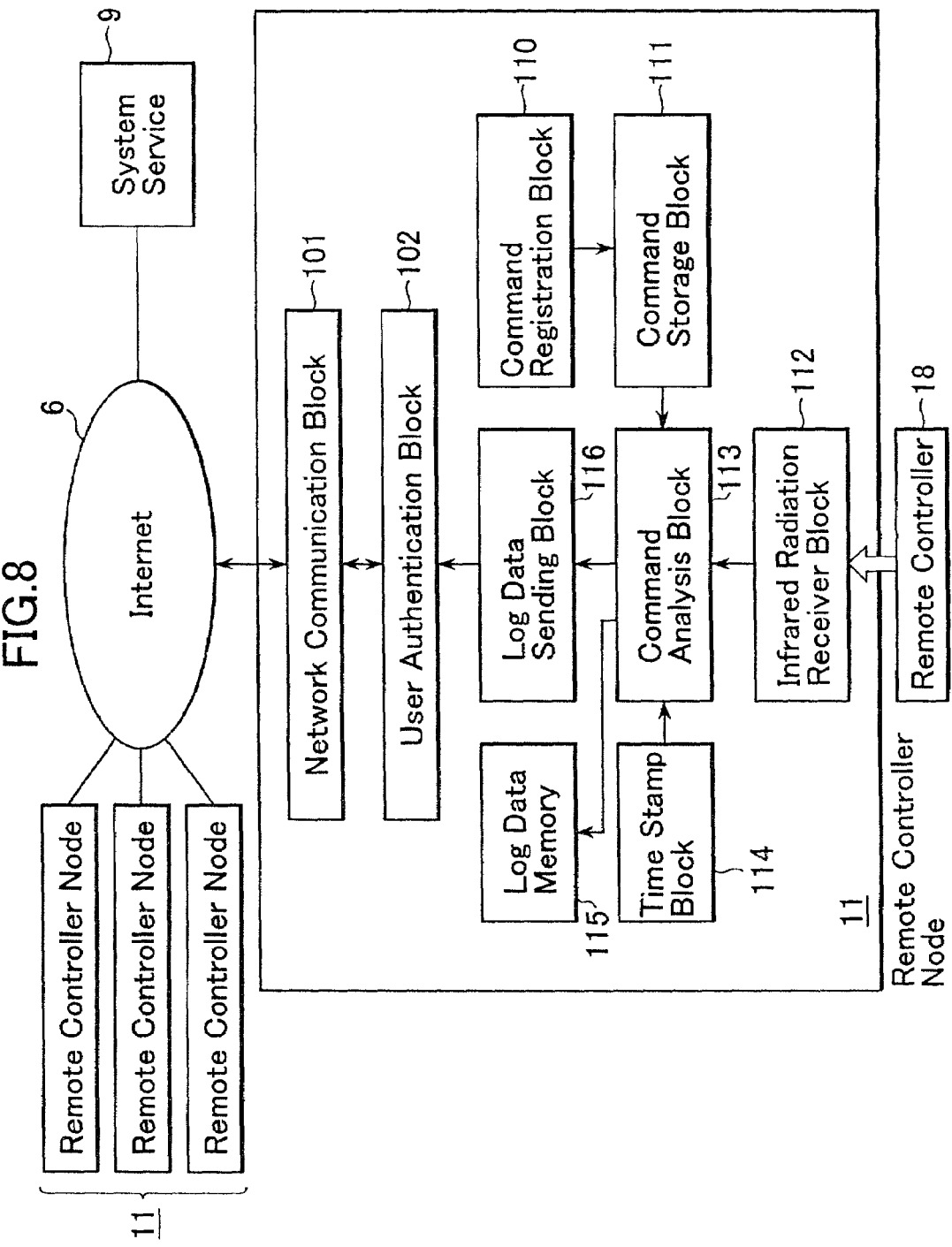
FIG. 8 is another example of the block diagram of the remote controller node 11 used in the embodiment of FIG. 6.

FIG. 8 is another example of the block diagram of the remote controller node 11 used in the embodiment of FIG. 6. Remote controller nodes 11 in FIG. 8 have a monitoring capability, whereby remote control signals are acquired and retransmitted.

In FIG. 8, an infrared radiation receiver block 112 receives remote control signals to be output in synchronization with operation timings from a target remote controller 18. The block then outputs the received remote control signals to a command analysis block 113. Remote control signals to be output from the target remote controller 18 include those of power-on/off, switching between received channels, volume control, and tape transport control, in the case of a VCR. In the case of a TV, these signals include those of power-on/off, switching between received channels, and volume control.

A remote control code corresponding to a control signal for executing the pre-programmed remote operation discussed earlier is input from the command storage block 111 to the command analysis block 113. Also input to the command analysis block 113 from the timestamp block 114 is a timestamp signal corresponding to the operation timing of the target remote controller 18.

The command analysis block 113 transfers raw remote control signals, or control data obtained by converting the remote control signals into specific details of control according to the remote control code and then providing the data with timestamps, to a log data memory 115 to store the signals or data therein, as well as outputs the signals or data to a log data sending block 116. Whether the raw remote control signals are output directly or output after having been pre-processed according to the remote control code is determined depending on the way the system is configured.

In the above-described system configuration, an audience rating survey is conducted as explained below.

1) A user operates a TV or VCR in the room using the remote controller 18.
2) All of the remote controller nodes 11 simultaneously receive a remote control signal.
3) If the received remote control signal is a pre-registered, identifiable one, the remote controller node 11 judges such items of information as which device the signal is directed at, the channel number, the time when programs were preset and the current time, from the remote control signal, and then collectively sends out the items to the system service section 9 or stores them in the node itself.
4) The system service section 9 selects a viewer's profile corresponding to the address from a database, according to the IPv6 address of the remote controller node 11. Thus, the section identifies the program being viewed, according to the residential address, channel number, timestamp, and other items of information.
5) The system performs these processes node by node, in order to analyze audience rating data from a variety of viewpoints, for example, an audience rating on the basis of time slots, programs, channel numbers or user profiles.

Consequently, it is possible to obtain accurate data for not only conventional TV audience ratings, but also the audience ratings of programs preset on a VCR that were considered difficult to deal with in conventional surveys.

Note that the remote controller is not limited to an infrared radiation method. The same advantages are available for remote controllers using a wireless method, such as Bluetooth (registered trademark).

By installing a camera or cameras in the room, it is also possible to determine who among the family members is watching the TV.

By using the user profile data acquired and analyzed by the system service section 9 and delivering advertisement content based on the user profile to each remote controller node 11, it is possible to efficiently deliver advertisement content that will help increase users' purchasing desire.

According to the second embodiment heretofore described, it is possible to carry out remote timer-recording operation, without having to retrofit any existing videocassette recorder or purchasing a new videocassette recorder. In addition, the operating status of a videocassette recorder can be monitored through a network. This feature is especially advantageous for measuring audience ratings.

Another advantage is that it is possible to realize efficient advertisement content delivery based on the user profile of each remote controller node.

Figure 9:
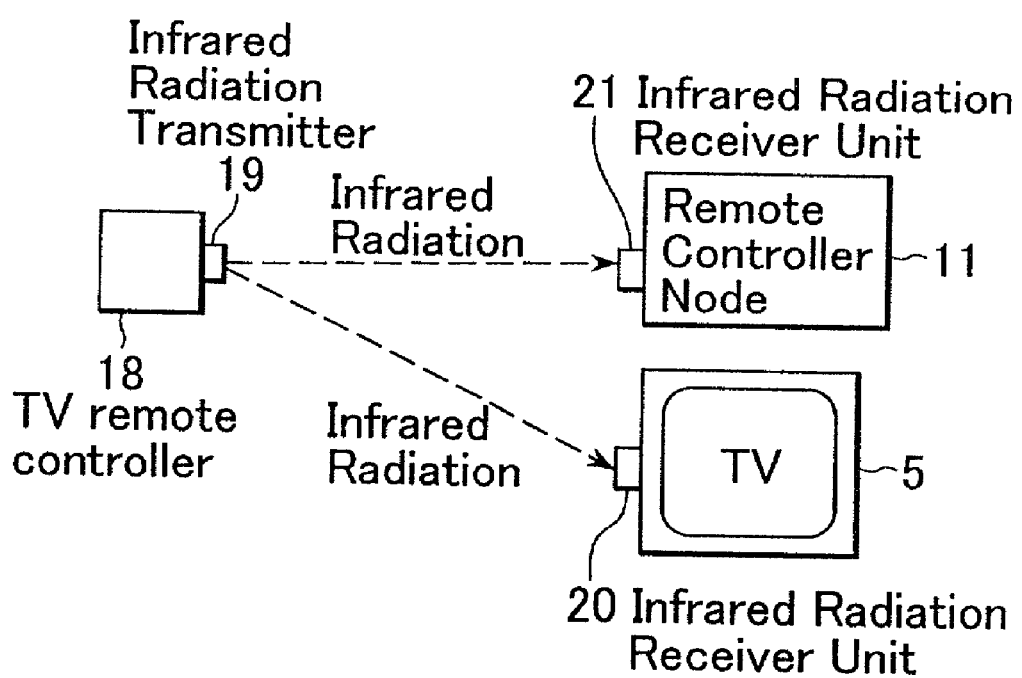
FIG. 9 is a conceptual view showing a television remote control system employing an infrared remote controller.

It should be noted here that the conventional configuration of part of the system, where an encoded infrared radiation signal transmitted from the TV remote controller 18 in FIG. 8 is received by the infrared radiation receiver block 112, has been as shown in FIG. 9.

In FIG. 9, a TV remote controller 18 is equipped with an infrared radiation transmitter 19 so as to encode various control signals, including the on-off signal of a power switch, channel selection signal, and volume control signal. Thus, the controller transmits the encoded control signals to the infrared radiation receiver unit 20 of a TV 5, using infrared radiation as a carrier.

The TV 5 decodes the encoded infrared radiation signal received by the infrared radiation receiver unit 20 so as to reproduce various control signals. According to these control signals, the TV 5 performs predetermined operations, such as turning on/off the power switch, selecting from channel numbers, and controlling the volume.

The system configuration of FIG. 9 has the following problems, however.

(1) Possibility of Failing to Catch Infrared Radiation Signals

An infrared radiation signal transmitted by the TV remote controller 18 may be successfully received by the infrared radiation transmitter receiver unit 20 of the TV 5, but may not be received by the infrared radiation transmitter receiver unit 21 of the remote controller node 11, or possibly vice versa. In other words, there is the possibility of failing to catch infrared radiation signals transmitted by the TV remote controller 18.

(2) Difficulty in Knowing the Device Status From Channel Up/Down Signals

To be able to know the channel number of the TV 5 from the channel up/down signal transmitted by the TV remote controller 18, it is necessary to know the channel status of the TV 5 immediately before the channel up/down signal was received. Even if the channel status of the TV 5 immediately before the reception of the channel up/down signal is known, the problem described in item 1 above remains unsolved.

Figure 10:
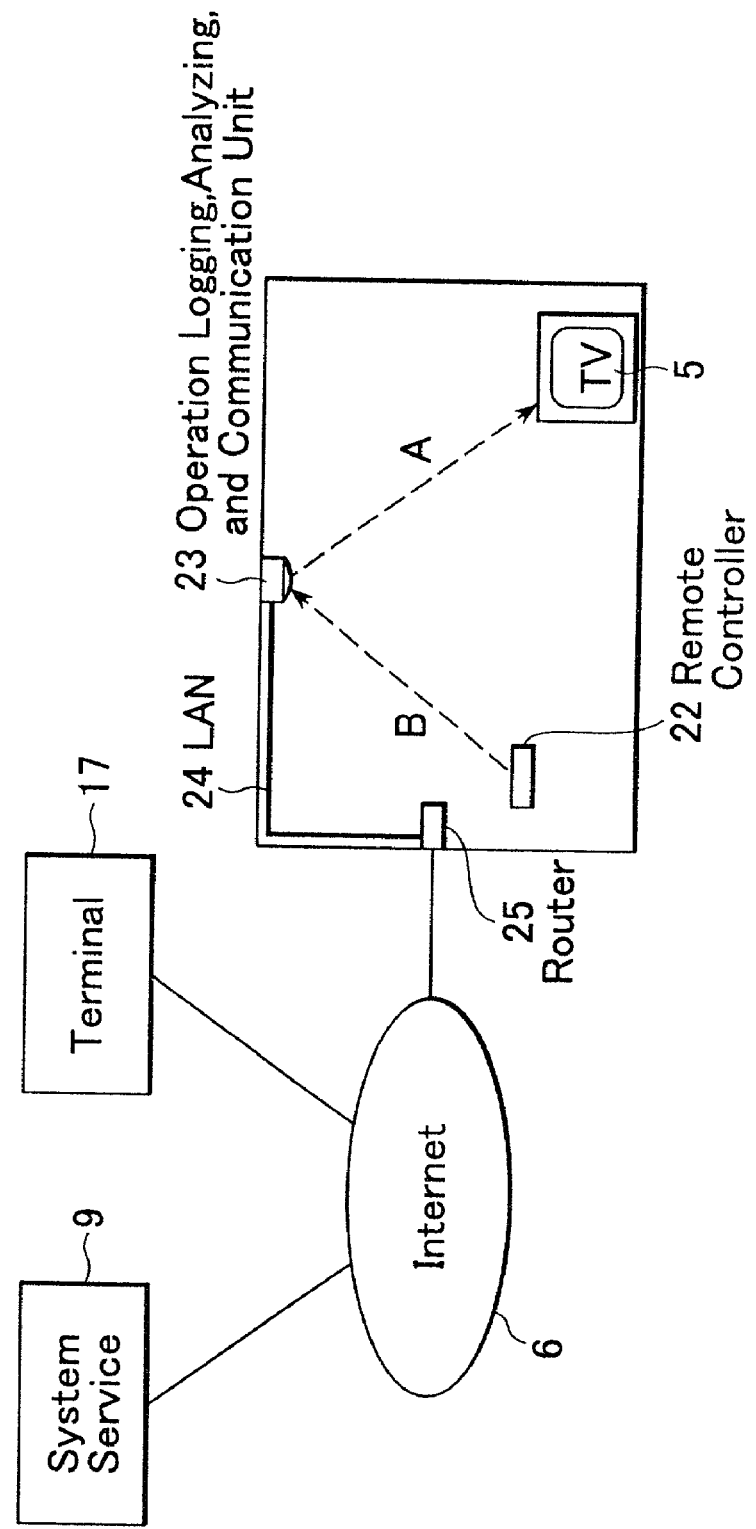
FIG. 10 is a schematic view showing a third embodiment of the system in accordance with the present invention.

These problems can be solved, however, by configuring the system as shown in the third embodiment of FIG. 10. In FIG. 10, a TV 5 is controlled with regard to, for example, power-on/off, channel selection and volume control, through a remote controller 22 and an operation logging, analyzing and communication unit 23.

The remote controller 22 transmits a command for operating the TV 5 in a signal form B different from a form A whereby the TV 5 can receive the command. The operation logging, analyzing and communication unit 23 receives the output signal B of the remote controller 22, and acquires the TV 5's historical record of operation according to a command thus received. In addition, the unit converts the command to a form A signal that the TV 5 can receive, and outputs the signal. Note that these signal forms A and B differ from each other at least either in the command system or in the wavelength of a signal for transferring commands.

Figure 11:
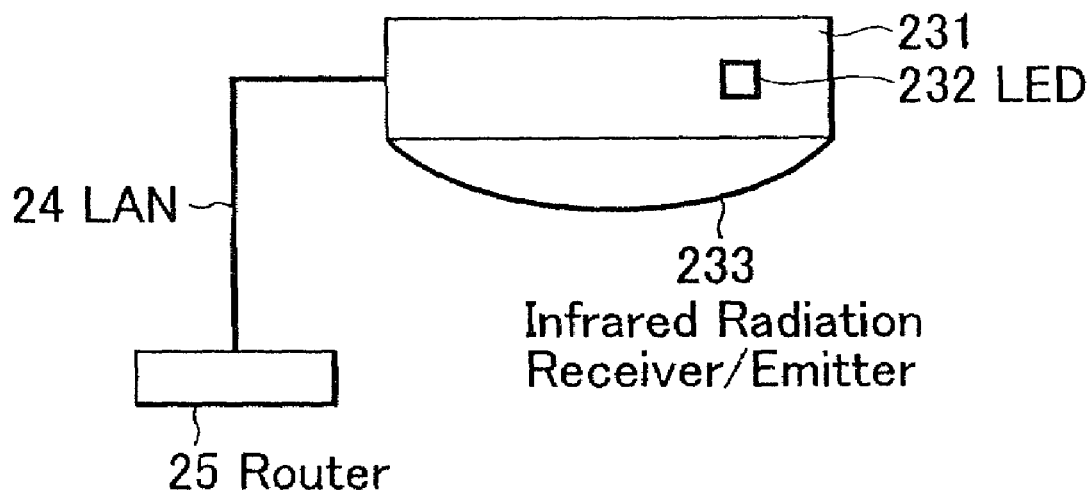
FIG. 11 is a conceptual view showing the configuration of an operation logging, analyzing and communication unit 23.

FIG. 11 is a conceptual view showing the configuration of an operation logging, analyzing and communication unit 23. The operation logging, analyzing and communication unit 23 comprises, for example, an operation logging, analyzing and communication block 231 for serving such purposes as analyzing specific actions upon the TV 5 according to commands and a historical record of operation, an LED 232 for visualizing the operating status by illumination, and an infrared radiation receiver/emitter 233 for receiving/transmitting infrared radiation.

The operation logging, analyzing and communication unit 23 is connected to the Internet 6 through a LAN 24 and a router 25 compliant with IPv6.

Also connected to the Internet 6 are, for example, a system service section 9 for integrally managing and controlling a plurality of operation logging, analyzing and communication units 23, a personal computer for accessing each individual operation logging, analyzing and communication unit 23 from an outdoor location, and such terminals 17 as a PDA and a mobile phone.

Since the remote controller 22 and operation logging, analyzing and communication units 23 are designed to send commands in mutually different signal forms A and B, the control signals do not cause cross-talk with each other. Consequently, the operation logging, analyzing and communication unit 23 can accurately know the status of the TV 5 and the way TV 5 is operated.

The system service section 9 acquires a historical record of operation data that this plurality of operation logging, analyzing and communication units 23 have analyzed. Then, the section makes a data analysis on, for example, audience ratings.

Figure 12:
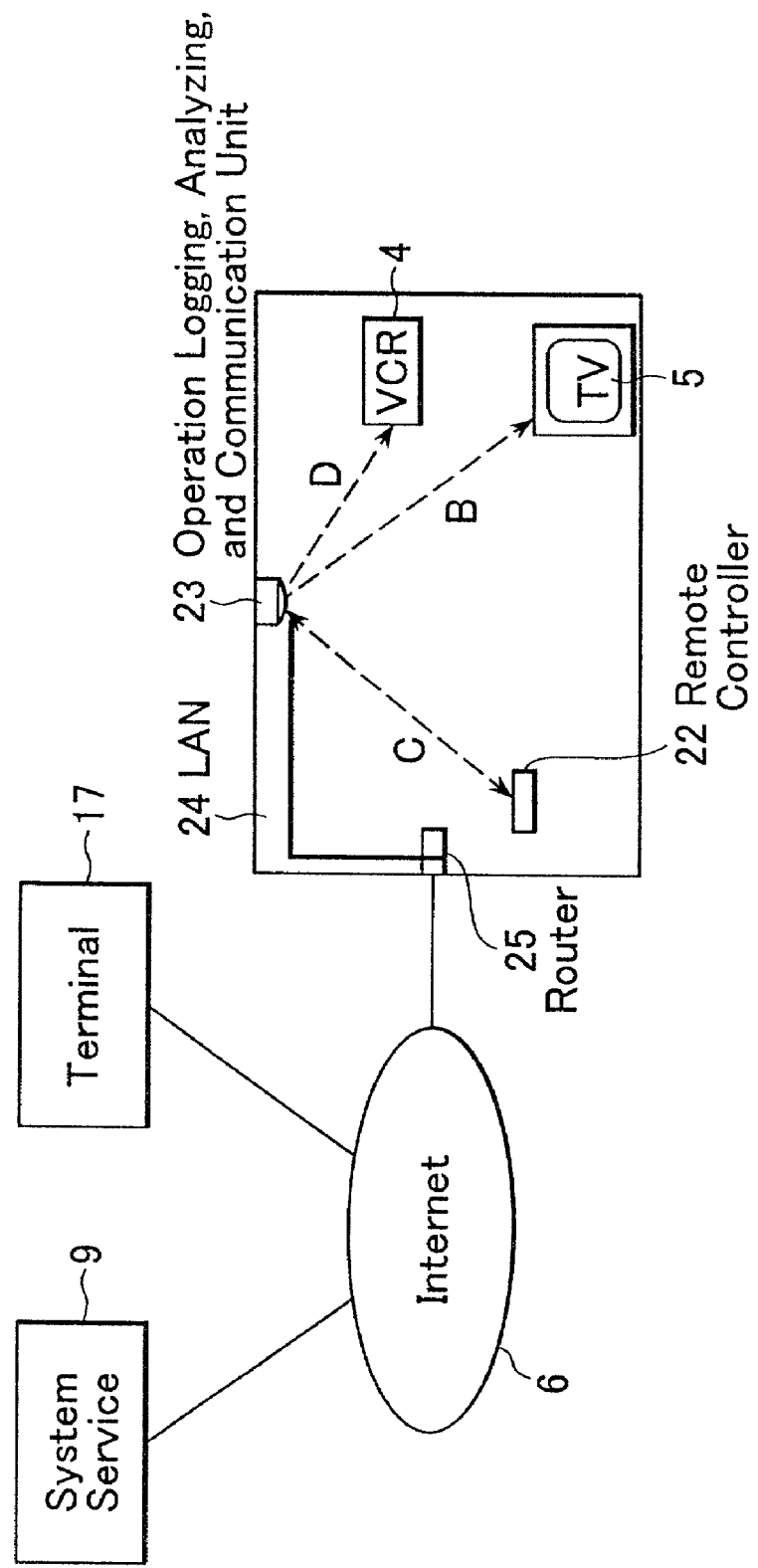
FIG. 12 is a conceptual view showing another example of the system in accordance with the present invention.

FIG. 12 is a conceptual view showing another example of the system in accordance with the present invention. The figure illustrates an example wherein the remote controller 22 covers not only the TV 5 but also a VCR 4, through an operation logging, analyzing and communication unit 23.

Also in FIG. 12, note that a signal form C between the remote controller 22 and operation logging, analyzing and communication unit 23, a signal form B between the operation logging, analyzing and communication unit 23 and the TV 5, and a signal form D between the operation logging, analyzing and communication unit 23 and the VCR 4 differ from one another.

Figure 13:
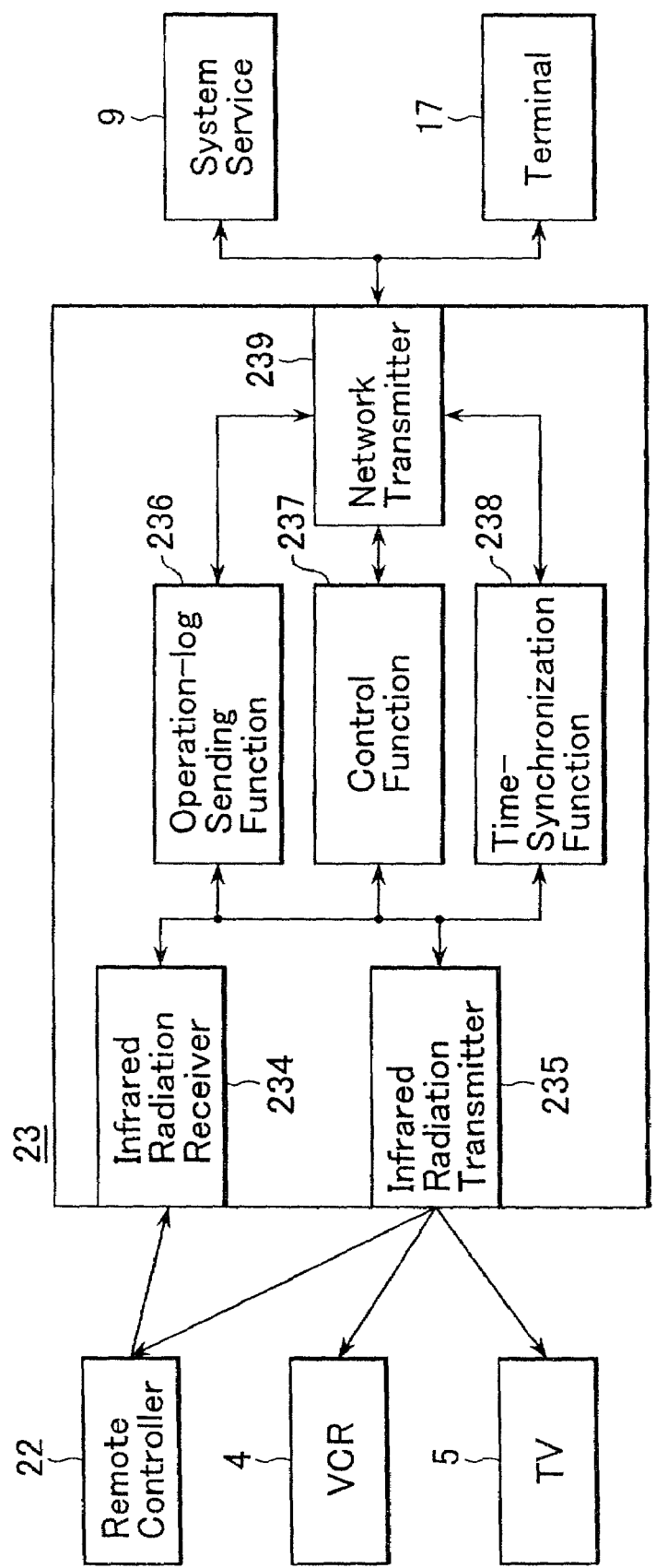
FIG. 13 is the functional block diagram of the operation logging, analyzing and communication unit 23 shown in FIG. 12.

FIG. 13 is the functional block diagram of the operation logging, analyzing and communication unit 23 shown in FIG. 12.

An infrared radiation receiver 234 receives infrared radiation signals transmitted from the remote controller 22.

An infrared radiation transmitter 235 transmits infrared radiation signals to the remote controller 22, VCR 4 and TV 5.

An operation-log sending function block 236 has the capability to deliver the TV 5's record of operation to the system service section 9.

A control function block 237 receives commands transmitted by the remote controller 22 through the infrared radiation receiver 234. Then, the block converts each of the commands to a required type of command suited for each TV and requests the infrared radiation transmitter 235 to transmit the command. It is also possible to receive such items of control request information directed at the TV 5 as power-on/off that are input through a terminal 17 by way of a network transmitter 239, and send out a command appropriate for the requested control by means of infrared radiation.

A time-synchronization function block 238 synchronizes (adjusts) the time between the operation logging, analyzing and communication unit 23 and the system service section 9. The time-synchronization function is necessary in order to record the time of operation.

With the above-described system configuration, the operation logging, analyzing and communication unit 23 can correlate the time, record of operation and TV program information, when the TV 5 is remote-controlled using the remote controller 22. Thus, it is possible to precisely know which program a user who operated the remote controller node 22 has watched.

Note that signal forms are in no way limited to infrared radiation, but may be electric signals.

According to the third embodiment heretofore described, the system of the present invention is suited for acquisition of data on audience ratings for TVs using wireless remote controllers.

What is claimed is:

1. An information delivery service system comprising:
   a service section for operating and controlling the overall information delivery service system, said service section being connected to a computer network;
   a plurality of nodes for viewing advertisement and information content and for providing profile data of each of a plurality of users, said plurality of nodes being connected to said network and there through to said service section and allocated with specific addresses which identify said plurality of users, said specific addresses being unique within said network; and
   a plurality of terminal devices comprising an advertisement server and a content server, for said plurality of users that sign contracts with the service section regarding the quality of service provided by the service section, acquire the right of access to said plurality of users having profile desired by the plurality of terminal devices for said, plurality of users and the right to use a given method of access, and pay costs for the services; wherein
   said service section comprises:
   means for acquiring and analyzing profile data;
   means for accessing data of each of said plurality of users;
   means for acquiring and delivering advertisement and information content provided by said terminal devices for said plurality of users;
   means for analyzing audience ratings in relation to information content;
   means for measuring effectiveness of advertisement; and
   means for billing advertisers; wherein said plurality of nodes comprises:
   a sensor means having at least one sensor for measuring one or more physical quantities;
   remote controller means for remote control;
   a set top box means for receiving broadcast, advertisement and information content; and
   other types of nodes; and wherein
   a user of the plurality of users declares limit of disclosure of profile data provided through one of said plurality of nodes against said service section; wherein
   said service section further comprises:
   means for providing said plurality of users with step by step incentives according to each limit of profile data disclosure; and wherein
   said service section further comprises:
   means for registering or deleting user profiles;
   means for executing a matching function, intermediary function, filtering function and node check function;
   means for registering or changing node address; and
   means for executing other processes while communicating with each of said plurality of nodes and terminal devices for said plurality of users through said network.

2. The system of claim 1, wherein said service section comprises: means for analyzing said user profile data and for delivering information content according to profile data of each user.

3. The system of claim 1, wherein each of said plurality of nodes comprises: means for sending through said network an output signal to said service section each time a relevant node is operated.

4. The system of claim 1, wherein said plurality of terminal devices comprise: a television set or a video cassette recorder; and wherein infrared signals are used for communication.

5. The system of claim 1, further comprising:
   a wireless remote controller for transmitting through said network a command for operating a device being remote controlled in a signal form which is different from a signal form which operates the device; and
   an operation means for receiving through said network an output signal from said wireless remote controller, for acquiring histric record of operation of said device according to a command, for changing the signal into a form that said device receives; and then for outputting said signal.

6. An information delivery service system comprising:
   a service section connected to a computer network;
   a terminal connected to said network as an input terminal and comprising a display screen, said terminal comprising a browser in a remote controller node on said screen and indicates a timer record of a program of interest;
   a program guide delivery company connectable to said network for regularly or irregularly delivering program guides according to an external instruction;
   a recorder; and
   said remote controller node for downloading program guides delivered from said company, and for saving information on date and time when each program starts and ends and a channel number in a format suited for control by said remote controller node; and wherein
   when a preset time occurs, said remote controller node sends out commands to said recorder according to a program information provided by said terminal to start recording and to stop recording when each time occurs; and wherein
   said remote controller comprises:
   a user authentication block;
   a program guide processing block;

a storage block for storing program guide and reservation;

a reservation block for generating reservation signals; and a command block for registration, storage and outputting of signals to said recorder.

7. The system of claim 6, wherein said service section comprises:

means for performing at least either billing to an advertiser or measurement of advertising effectiveness according to a record obtained through said network of data on access to information content.

8. The system of claim 6, comprising means for carrying out said recording of data on access to advertisement through said network in response to a request from said service section.

9. The system of claim 6, comprising means for carrying out transmission of said record of data on access to information content from each node of said service section through said network in response to request from said service section.

10. The system of claim 6, comprising means for carrying out transmission of said record of data on access to advertisement content by each node in response to request from said service section through said network.

11. The system of claim 6, comprising means for carrying out transmission of said record of data on access to broadcast content from each node through said network to said service section autonomously by each node in response to a request from said service section.

12. The system of claim 6, wherein said service section further comprises: means for analyzing and processing data on audience rating of television.

13. The system of claim 6, wherein devices are connected to the remote controller, said devices being television or video cassette recorders, and wherein infrared radiation signals are used for command.

14. The system of claim 6, further comprising:

a wireless remote controller for transmitting through said network a command for operating a device being remote controlled in a signal form which is different from a signal form said device is remotely controlled; and an operation means for receiving through said network an output signal from said wireless remote controller, for acquiring historic record of operation of said device according to a command, for converting said command into a form of a signal that said device receives, and then for outputting said signal.

* * * * *